United States Patent [19]

Salvesen

[11] Patent Number: 5,313,505
[45] Date of Patent: May 17, 1994

[54] ROD HANDLING APPARATUS

[76] Inventor: William R. Salvesen, P.O. Box 626, Palisades Park, N.J. 07650

[21] Appl. No.: 55,669

[22] Filed: Apr. 29, 1993

[51] Int. Cl.$^5$ .................. G21C 19/00; G21C 21/00
[52] U.S. Cl. .................. 376/261; 198/346.2; 414/157; 414/222; 414/746.7
[58] Field of Search .................. 376/261, 260; 198/346.2; 414/157, 222, 746.7; 53/504

[56] References Cited

U.S. PATENT DOCUMENTS

| | | | |
|---|---|---|---|
| 3,213,997 | 10/1965 | Fryer | 198/346.2 |
| 3,666,086 | 5/1972 | Brockmann | 198/774.4 |
| 4,440,292 | 4/1984 | Regenbrecht | 198/774.1 |
| 4,516,307 | 5/1985 | Beard et al. | 198/775 |
| 4,522,276 | 6/1985 | Fogg et al. | 414/403 |
| 4,788,786 | 12/1988 | Suter | 198/346.3 |
| 4,804,077 | 2/1989 | John, Jr. | 198/774.1 |
| 4,928,811 | 5/1990 | Waineo | 198/774.4 |

*Primary Examiner*—Daniel D. Wasil
*Attorney, Agent, or Firm*—Frederick I. Levine

[57] ABSTRACT

ROD HANDLING APPARATUS comprises a continuously operated modified walking beam conveyor apparatus activated mechanically, electrically and electronically, utilizing computer and servomechanism technology to control the movement of a series of nuclear fuel rods with provision for their varying length and diameter so that their ends may be heat treated simultaneously. Rods are loaded into a conveyor and rest on conveyor V-blocks attached to conveyor chains which are then moved forward, powered and controlled by a conveyor servomotor, to align the rods with a heat treater units. Then the conveyor stops and a separate set of lifting V-blocks controlled by an eccentric arm powered by a lift plate servomotor, raises the rods to align them with receptacles in the heat treater units. The heat treater units move transversely so that the ends of the rods are inserted a set distance into the receptacles and the heat treating cycle is started. After completion of this cycle, the heat treater units are retracted and the lift plate V-blocks lower the rods into the conveyor. The conveyor again moves forward, unloading the treated rods and the cycle is repeated. This apparatus may be used for processing the ends of nuclear rods and other type of rods, tubes, bars, pipes, etc., for other operations including welding, coding, polishing, deburring, attaching fittings, etc., and, with the addition of processing units on the opposite side of the conveyor, both ends of the rods can be operated on simultaneously.

8 Claims, 5 Drawing Sheets

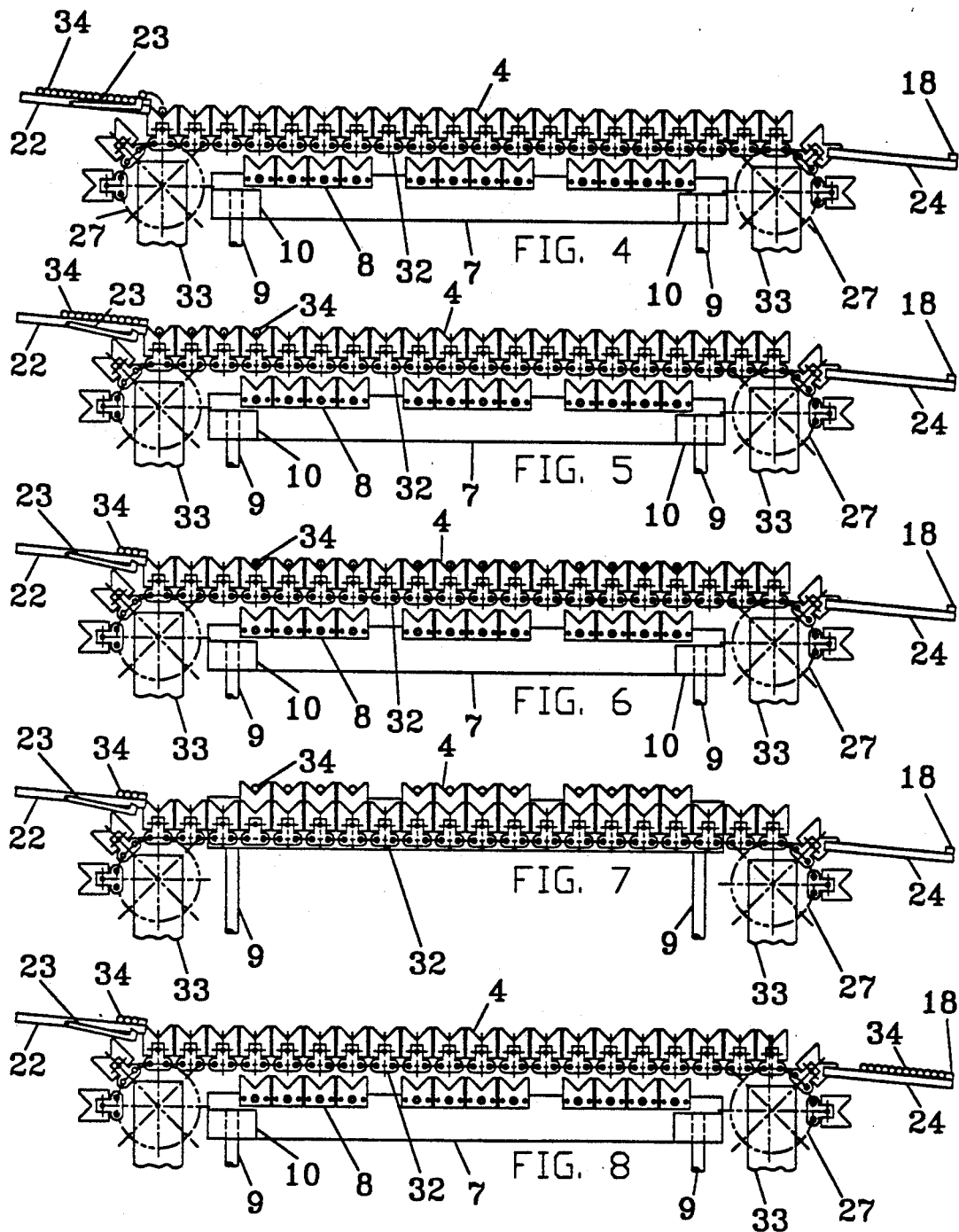

ROD HANDLING APPARATUS

BACKGROUND OF THE INVENTION

My invention, ROD HANDLING APPARATUS, applies to the processing of tubes, especially the heat treating of nuclear fuel rods, hereinafter called rods, which are used in the core of nuclear reactors. While these are actually thin walled tubes, they are called rods in the nuclear industry.

The rods are sealed on one end, then heat treated at that end. This is in addition to processing such as welding, deburring, cleaning, pressure testing, etc. After heat treating, nuclear fuel pellets are inserted into the rods and the other end is sealed. The filled rods are then grouped into bundles and placed inside the core of a nuclear reactor where water is circulated, heated by the rods and used to generate electricity.

Until now, walking beam devices were one of the main machines used to transport the rods for processing. The problem is that walking beams must move in a rectangular or square transfer path. The rod must first be lifted, then transferred forward, lowered and placed in a support. Then the walking beam must travel below the rods in the supports in order to return to pick up another rod and transfer all of the rods one step at a time.

My invention processes multiple rods which may be up to thirty or forty rods at a time. The accompanying drawings shows twelve rods being processed for clarity and brevity. Transferring these with a walking beam requires thirty or forty individual lifts, transfers and lowerings making this inefficient, time consuming and costly.

In addition, a walking beam complicates the design of the machine and causes handling problems with possible rod jams, loss of control, or increased machine maintenance. Another problem is that after the heat treating operation is complete and the rods are on the walking beam supports again, the rods must be removed from the machine. This means that the walking beam would have to make a cyclic motion to remove each rod from the system meaning another thirty to forty motions. Another drawback is that a walking beam is not suited for ease of changeover for different diameters of rods.

Other machines are based on pneumatic devices, endless conveyor belts, rotary motion with cams, or shafts, and hydraulic units but cannot meet all the benefits of my invention.

My invention is a modified walking beam which can continually and automatically process multiple rods and which can accommodate rods of varying lengths and diameters and is precisely controlled using computer and servomechanism technology resulting in high efficiency and the ability to be operated by unskilled labor. Since the rods must be kept straight, my invention consists of numerous supports to guard against flexing and bending. My machine answers the need for one which will result in economies of time and labor, needing little maintenance, yielding a superior product and which has a ready market.

This machine can also be used to perform many physical and chemical operations on rods, tubes, bars, pipes, etc., on either one or both ends.

SUMMARY OF THE INVENTION

A primary object of my invention, ROD HANDLING APPARATUS, is to fill a long felt need for a novel apparatus using a new method incorporating the latest technology which is simple to operate and greatly increases the efficiency of processing nuclear fuel rods, hereinafter called rods.

A further object is to provide a machine which is precise in performance, is easily controlled, is safe to operate and can be operated by unskilled workers.

It is also an object of the invention to provide a machine for processing multiple rods at one time with treatment precisely duplicated for each rod, controlled by computer and servomechanisms, which is efficient and requires little maintenance.

A notable object is to provide a machine which can process different lengths of rods with a simple set-up.

Another prime object is to furnish a system which can process various diameters of rods with ease by programming the software of the machine's computer without any physical changes to the machine.

To achieve the above and other objects, it is the aim of my invention to agree with the following preferred embodiments, comprising an infeed ramp with an escapement device which is mounted on a conveyor support. This is where the operator loads the rods for heat treating. An rod end guide on the side where a heat treating unit is located evens up the rod ends. A stop at the end of the ramp lines up the rods and a lift finger feeds the rods into conveyor V-blocks mounted on the conveyor. The conveyor consists of an over/under indexing chain with conveyor V-blocks of predetermined spacing. Numerous chains and conveyor V-blocks are used to support the rods and keep them from bending and flexing. Each chain is supported by a rail to prevent its sagging. At one end of the conveyor there is a sprocket driven by a conveyor servomotor which advances the conveyor V-blocks. The other end of the chain has a spring-loaded takeup to keep a constant tension on the chain. The conveyor servomotor indexes any length of travel programmed into the unit, allowing the rods to be fed into adjacent conveyor V-blocks or skipping a predetermined number of conveyor V-blocks. After a rod has been lifted from the infeed ramp, it rolls into a conveyor V-block on the conveyor chain and the conveyor servomotor indexes the chain to the next appropriate conveyor V-block. When the proper amount of rods have been loaded into the conveyor V-blocks, with the proper spaces required, they are indexed to a position that will line up the rods with the receptacles in the heat treater units. Lift plate V-blocks attached to the conveyor support then raise the rods from the conveyor V-blocks to the proper height for insertion into the receptacles. The lift plate V-blocks are elevated by an eccentric arm powered by a lift plate servomotor which can be programmed for variation in height necessary for different diameter of rods. The heat treater units move transversely so that the ends of the rods are inserted a set distance into the receptacles for the heat treating cycle. After completion of this cycle, the heat treater units are retracted and the lifting V-blocks lower the rods into the conveyor V-blocks. The conveyor servomotor then moves the conveyor forward in one continuous motion unloading the rods from the conveyor V-blocks into an eject ramp where they are removed for further operation.

This machine has additional uses comprising, but not limited to, physical and chemical treatments of the rods, tubes, bars, pipes, etc., to one or both ends, including, but not limited to etching, cleaning, deburring, polishing, attaching fittings, coding, machining, etc.

Other objects of my invention as well as accompanying novel features will appear in the contents of the following description and recited in the claims.

BRIEF DESCRIPTION OF DRAWINGS

The accompanying drawings form a part of the specification and are to be read in conjunction therewith, and in which like reference numbers are used to indicate like parts in the various views, according to the preferred embodiments, utilizing the methods as described herein:

FIGS. 4, 5, 6, 7, 8, are elevated views showing the feeding of the rods into the conveyor at the beginning of the cycle, to the lifting and lowering of the rods, and then, ejecting of the rods onto the eject ramp.

DRAWING REFERENCE NUMERALS

Figure 1:
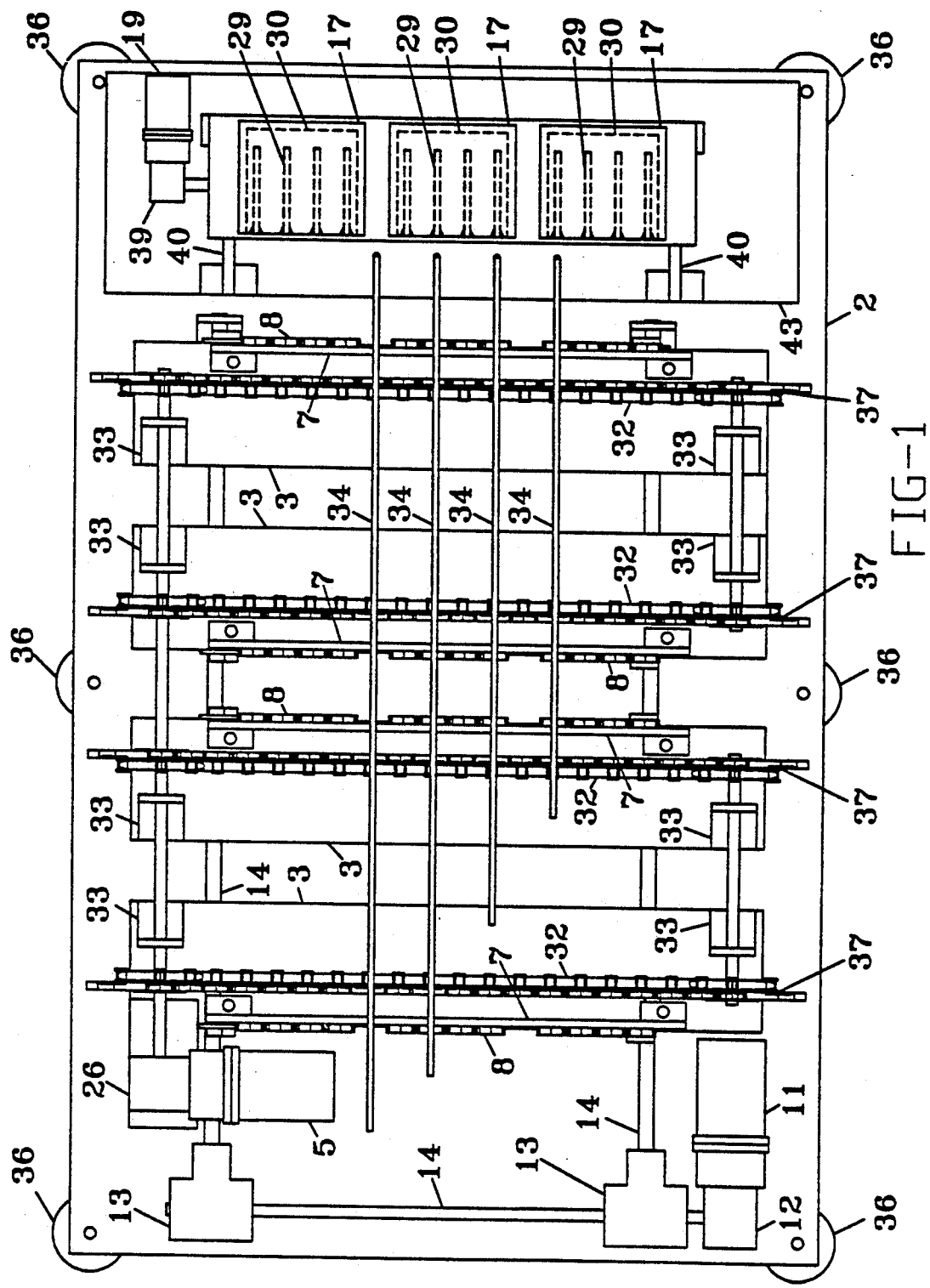
FIG. 1 is a plan view of my ROD HANDLING APPARATUS showing all the sections of the machine along with the heat treater units.

1. Main View, FIG. 1
2. Main Mounting Plate
3. Conveyor Mounting Plate
4. Conveyor V-block
5. Conveyor Servomotor
6. Conveyor Drive Shaft
7. Lift Plate
8. Lift Plate V-block
9. Lift Plate Shaft
10. Lift Plate Bearing Block
11. Lift Plate Servomotor
12. Lift Plate Gear Reducer
13. Right Angle Drive
14. Lift Plate Drive Shaft
15. Eccentric Arm
16. Connecting Rod
17. Heating Treater Unit
18. Eject Stop Plate
19. Drive Motor
20. Slide Bearing
21. Conveyor Motor Mounting Plt
22. Infeed Ramp
23. Infeed Ramp Finger
24. Eject Ramp
25. Rigid support Post
26. Conveyor Gear Reducer
27. Conveyor Sprocket
28. Lift Shaft Clamp Block
29. Receptacle
30. Load Coil
31. Eject Ramp Stop Plate
32. Conveyor Chain
33. Conveyor Support Bracket
34. Nuclar Fuel Rod
35. Lift Plate Clamp Block
36. Leveling Pad
37. Conveyor
38.
39. Drive Motor Gear Reducer
40. Slide Rod
41. Drive Gear
42. Driven Rack
43. Heating Treater Unit Stand
44. End Guide Plate

DESCRIPTION OF THE PREFERRED EMBODIMENT

To promote an understanding of the principles of the invention, I refer to the embodiment shown in the drawings and to the particular language employed in the description with no intent to limit the range of the invention. This includes any modification of the portrayed apparatus and any further changes or applications of the basis of the invention as shown therein being normally considered to the skilled in the art related to this invention. This embodiment relates to the heat treating of nuclear fuel rods, hereinafter called rods, which are used in the core of nuclear reactors. While these are actually thin walled tubes, they are called rods in the nuclear industry.

FIG. 1 is a plan of my invention, ROD HANDLING APPARATUS, main view 1, which can process multiple rods simultaneously and present the relationship of the main components of the system which are a conveyor 37, conveyor chains 32, conveyor V-blocks 4 running parallel with each other, spaced according to the length of rods 34 being processed. The number of conveyor chains 32 and conveyor V-blocks 4 depends on the length of rods 34. Various length rods 34 can be processed at the same time. In this case there are four conveyor chains 32 used, to keep the rod straight and to limit flexing and bending. Alongside of the conveyor chains 32 are lift plates 7, with lift plate V-blocks 8. They are positioned so that each pair of conveyor chains 32 has two lift plates 7 running parallel and outside of each pair of conveyor chains 32. The lift plates 7 are mounted on the conveyor mounting plate 3, which also holds conveyor support brackets 33, conveyor servomotor 5, conveyor gear reducer 26, conveyor drive shaft 6 and conveyor sprockets 27. Shown on the conveyor are four different length rods 34 that can be processed through the system. Also shown in this view is a lift plate servomotor II, lift plate gear reducer 12, right angle drives 13, and lift plate drive shafts 14. All this is mounted on a main mounting plate 2, with its leveling pads 36. To the right of the conveyor chains 32, opposite servomotors 5, 11, heat treater units 17, load coils 30 and receptacles 29, are mounted on stand 43, along with a drive motor 19 and drive motor gear reducer 39.

Figure 2:
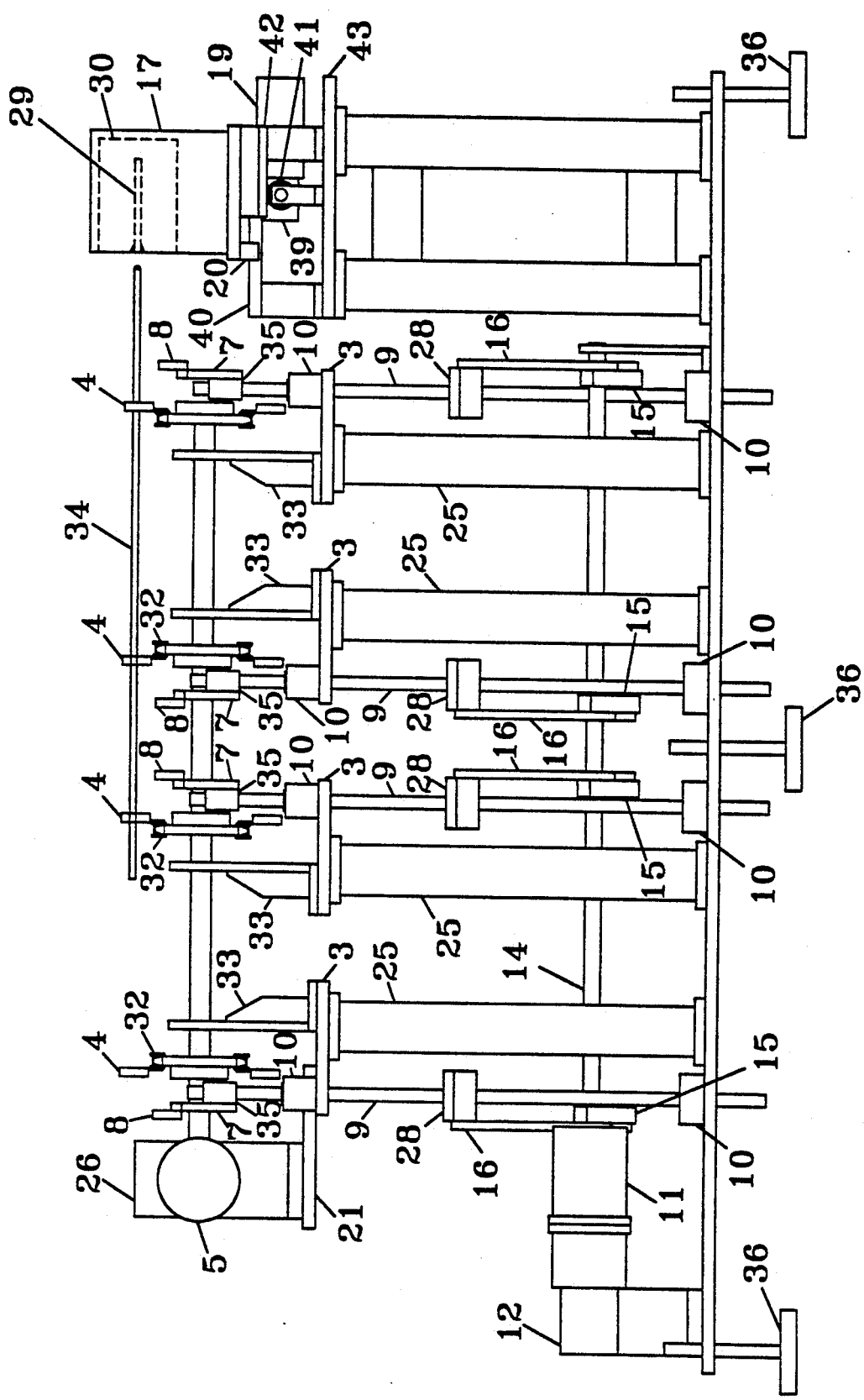
FIG. 2 is an elevated view of the ROD HANDLING APPARATUS showing the relationship of the conveyors and the lift plates.

FIG. 2 shows the elevated side view relationship between the parallel spaced conveyor chains 32, conveyor V-blocks 4, conveyor mounting plates 3, conveyor support brackets 33, along with the lift plates 7 and lift plate V-blocks 8. All of these are supported on conveyor mounting plates 3, mounted on rigid support posts 25, which in turn are secured to the main mounting plate 2. The conveyor servomotor 5, and the lift plate servomotor 11, can be seen in their relationship to the structure. The conveyor servomotor 5, is mounted on a conveyor motor mounting plate 21, on the end conveyor mounting plate 3 while the lift plate servomotor 11 is mounted on the main mounting plate 2. Also shown in detail are the lift plate parts. These are shown in a vertical attitude next to and below the conveyor chains 32. They consist of lift plate shafts 9, lift plate bearing blocks 10, lift plate clamp blocks 35, lift plate servomotor 11, lift plate gear reducer 12, right angle drives 13, lift plate drive shaft 14, eccentric arm 15, connecting rods 16, and lift shaft clamp block 28. The lift plate servomotor 11 raises and lowers all the lift plates 7 in unison due to the design and positioning of the eccentric arm 15. The conveyor chain V-blocks 4, are on a higher level than the lift plate V-blocks 8. This is required in order to transfer the rods through the system without lifting and lowering them on each advance cycle as in a walking beam design. To the right of the conveyor chains 32 and lift plates 7, opposite the servomotors 5, 11, the heat treater units 17, with the load coils 30, and receptacles 29, are mounted on their own stand 43, along with a drive motor 19, drive motor gear reducer 39, slide bearing 20, slide rod 40, drive gear 41 and a driven rack 42.

Figure 3:
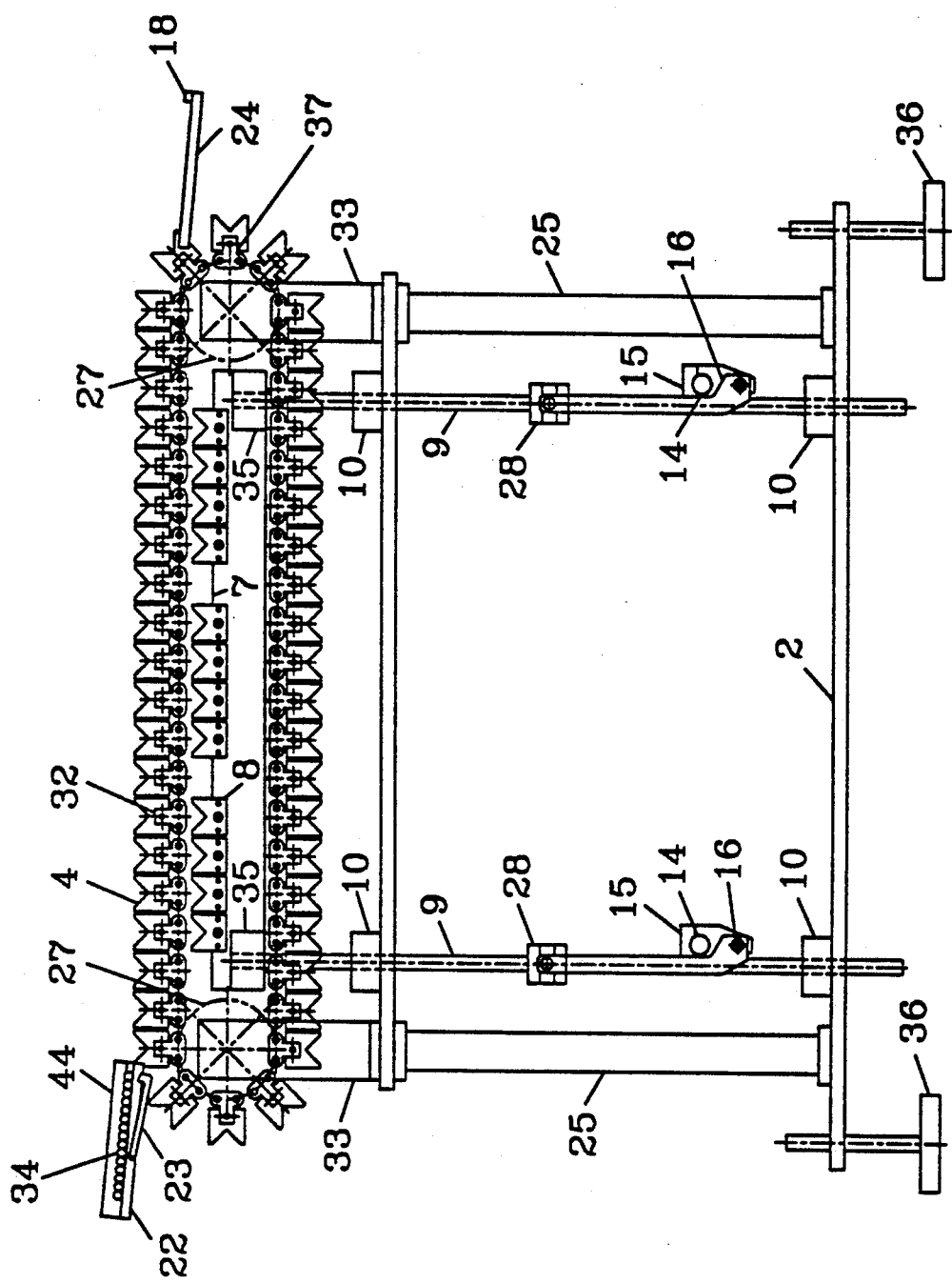
FIG. 3 is an elevated view showing an infeed ramp, end guide plate, lift fingers, conveyors for transporting rods through the system, lift plates for raising and lowering the rods and an eject ramp to hold the completed processed rods.

FIG. 3 illustrates the elevated end view of the conveyor system showing an infeed ramp 22, with a end guide plate 44 which evens the ends of the rods 34, infeed ramp finger 23, conveyor chain 32, conveyor V-blocks 4, lift plate 7, and the lift plate V-blocks 8. Also shown is a partial section of the lift mechanism including the lift plate bearing block 10, lift plate drive shafts 14, eccentric arms 15, connecting rods 16, and lift shaft clamp blocks 28. The two lift plate shafts 9, are driven with the lift plate servomotor 11, to rotate the two eccentric arms 15, to a specific angle, for each lift plate 7 so that they raise the lift plates 7 parallel with the conveyor chains 32. All the lift plates 7 are then raised exactly the same for the complete raising and lowering motion. The lift plates 7 raise the rods 34 to a position above the conveyor V-blocks 4 and align all the rod centers to match the centers of the receptacles 29 in the load coils 30. After the rods 34 are processed, the lift plate V-blocks 8 are lowered to return the rods 34 to the conveyor V-blocks 4 and then they are ejected from the conveyor V-blocks 4 in one continuous motion of the conveyor chains 32 to place them on an eject ramp 24 and rest at the eject stop plate 18.

FIGS. 4, 5, 6, 7, and 8 are elevated side views and illustrates the different position of the rods 34 in the conveyor chain 32, with the conveyor V-blocks 4, and the lift plates 7, with the lift plate V-blocks 8 raising and lowering the rods 34.

FIG. 4: This shows the infeed ramp 22, with rods 34, waiting to be loaded into the conveyor V-blocks 4, after the first rod is loaded into one conveyor V-block 4.

FIG. 5: This shows that four rods have been loaded into the first four conveyor V-blocks 4. At this point the conveyor chain 32 indexes the distance of two conveyor V-blocks 4 in order to leave one empty conveyor V-block 4 to create the proper spacing for processing.

FIG. 6: This show that the next four rods 34, have been loaded into the next four conveyor V-blocks 4, then two more conveyor V-blocks 4 are indexed to skip a conveyor V-block 4, another four rods 34 are loaded making a total of twelve rods 34 for heat treating. Then the conveyor chain 32, is indexed until the conveyor V-blocks 4 loaded with rods 34, come into alignment for heat treating.

FIG. 7: This shows that the lift plate 7, with the lift plate V-blocks 8, have lifted the rods from the conveyor V-blocks 4, to the proper height to align the centers of the rods 34 for heat treating.

FIG. 8: This depicts, after heat treating, the lift plate 7 lowered and all the rods 34 unloaded from the conveyor V-blocks 4 with all rods 34 on the eject ramp 24 resting against the eject stop plate 18.

Figures 9, 10:
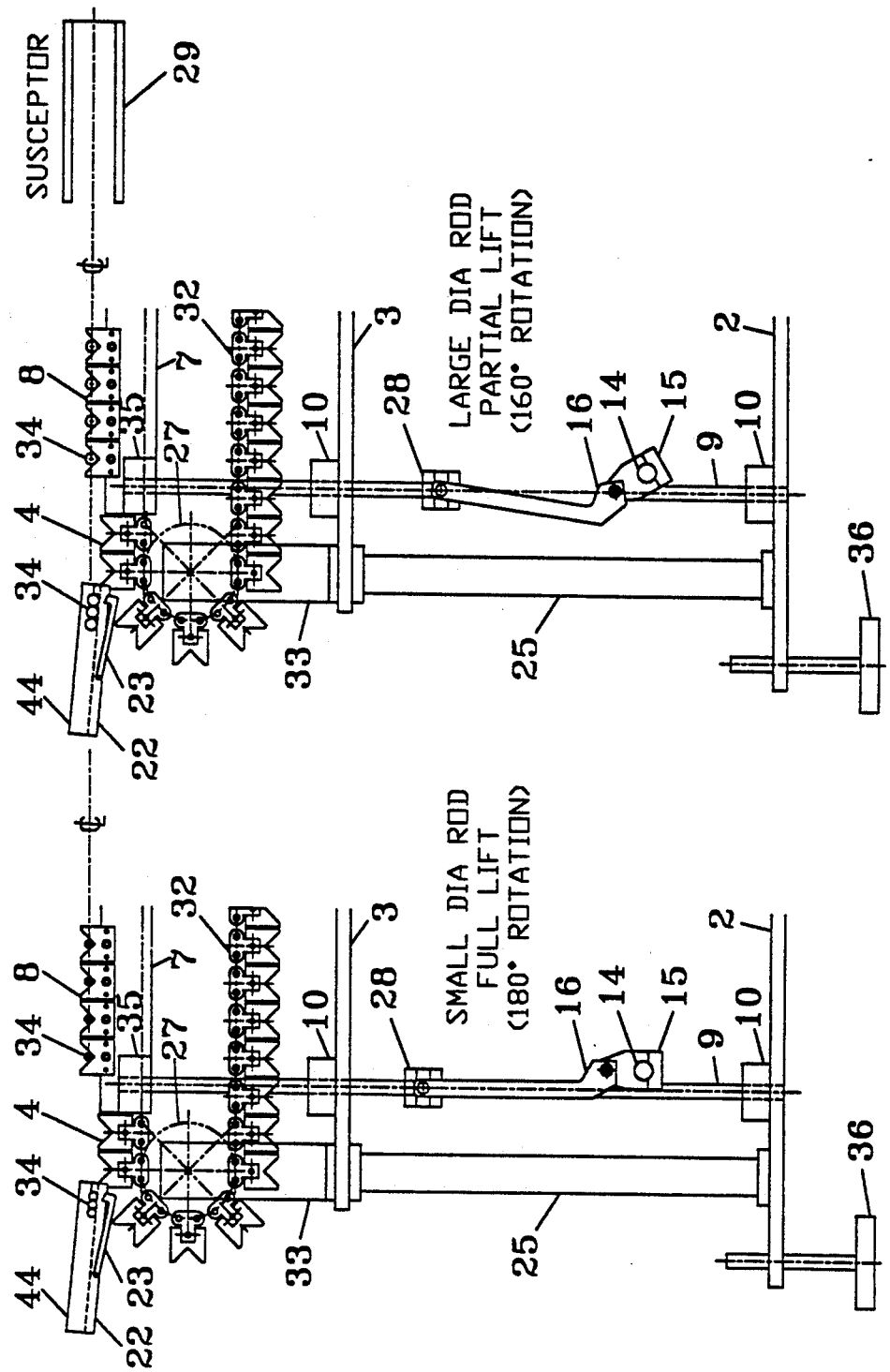
FIGS. 9 and 10, are elevated views showing how the small diameter rods and the large diameter rods are lifted to align the rod centers with the centers of the receptacle in the heater units.

FIGS. 9 & 10 are elevated side views and illustrate the way the lift plate V-blocks 8 are raised and lowered with the drive mechanism consisting of the eccentric arms 15 and connecting rods 16, raising and lowering the lift plates 7, to accommodate rods 34, of different diameter.

FIG. 9: This depicts the lift plates 7, in the raised position aligning the center of rods 34, of small diameter, in the lift plate V-blocks 8 to the center of the receptacles 29. The eccentric arm 15 has rotated 180 degrees to bring the lift plate V-blocks 8 to the highest position.

FIG. 10: This depicts the lift plate 7, in the partially raised position aligning the centers of rod 34, of large diameter, in the lift plate V-blocks 8 to the centers of the receptacles 29. Note that the eccentric arm 15, has not rotated completely up to the top of the rotation (less than 180 degrees) as in the lifting of the rods 34, of small diameter. This is because rods 34, of large diameter, don't sit as low in the lift plate V-blocks 8 as rod 34, of smaller diameter. Thus the lift plate V-blocks 8 do not have to be lifted as high to align the centers of the rods 34, of larger diameter, to the centers of the receptacles 29 which always remain at the same elevation.

To summarize the process of heat treating, rods 34 are loaded at the in-feed ramp 22, transferred to conveyor V-blocks 4, mounted on the conveyor 37, which moves rods 34 forward to align them below receptacles 29 for heat treating. At this point the conveyor 37 is stopped and the lift plate V-blocks 8 are raised so that the centers of rods 34 are aligned to the center of the receptacles 29. The receptacles 29 move transversely to insert the rods 34 a set distance into the receptacles 29. When the heat treating cycle is completed, the receptacles 29, are retracted. The lift plate V-blocks 8 are lowered to again rest the rods 34 in the conveyor V-blocks 4. The conveyor 37 then moves forward and rods 34 are unloaded to the eject ramp 24. The cycle is then repeated.

Although this invention describes heat treating the ends of rods, the same apparatus can be used for other operations such as bar coding, welding, cleaning, polishing or machining, etc., one end or both ends of rods tubes, pipes, bars, etc., and should not be construed as limiting the potential of handling to only one type of operation as shown herein.

What is claimed is:

1. A powered apparatus with provisions for horizontal and vertical movement to transport multiple articles to and from processing units for simultaneously processing their ends, comprising;
   (a) a base;
   (b) a frame attached to the base;
   (c) a mounting plate connected to the frame;
   (d) a conveyor affixed to the mounting plate with drive means to horizontally and longitudinally transport multiple articles to processing units for simultaneously processing their ends and to unload the articles after processing;
   (e) an infeed ramp joined to the frame to load the articles on the conveyor;
   (f) a lifting means attached to the frame to raise the articles vertically from the conveyor, while compensating for various cross sectional sizes of the articles, to fit receptacles in the processing units and to lower them back to the conveyor after processing;
   (g) an exit ramp connected to the frame to unload the articles.

2. A powered apparatus with provisions for horizontal and vertical movement to transport multiple articles to and from processing units for simultaneously processing their ends, comprising;
   (a) a base;
   (b) a frame attached to the base;
   (c) a mounting plate connected to the frame;
   (d) a conveyor affixed to the mounting plate;
   (e) conveyor chains attached to the conveyor such that sufficient chains are installed to support the articles to keep them from bending and flexing;

(f) conveyor V-blocks attached to the conveyor chains, spaced to line up with receptacles in the processing units, and to hold the articles for transport;

(g) an infeed ramp connected to the frame to load multiple articles individually onto the conveyor V-blocks for transport to the processing units for simultaneous processing;

(h) an end guide plate mounted on the infeed ramp to even up the ends of the articles;

(i) infeed ramp fingers connected to the infeed ramp to feed the articles individually to the conveyor V-blocks;

(j) conveyor drive means to move the conveyor chains longitudinally and horizontally so that a multiple of the articles are loaded individually from the infeed ramp onto the conveyor V-blocks at predetermined spacing and moved to align the vertical axes (y axes) of both the articles and receptacles in the processing units, to stop to process the articles and, after such processing, to move the articles for unloading;

(k) conveyor controller means to program the action of the conveyor drive means;

(l) lift plates attached to the frame, straddling the conveyor chains;

(m) lift plate V-blocks mounted on the lift plates, aligned with the receptacles in the processing units and spaced the same as the conveyor V-blocks, to support the articles when they are raised and lowered vertically, each lift plate V-block holding one article;

(n) eccentric arms attached to the lift plates to raise and lower the lift plate V-blocks vertically;

(o) lift plate drive means attached to the eccentric arms to rotate the eccentric arms a predetermined angle and raise the lift plate V-blocks vertically which remove the articles from the conveyor V-blocks when the articles are to be raised and align the articles for insertion into the receptacles of the processing units, thus compensating for various cross-sectional sizes of the articles and for the difference in height between the receptacles and the conveyor V-blocks, then lower the multiple articles after they have been processed simultaneously and restore them to the conveyor V-blocks;

(p) lift plate controller means to program the action of the lift plate drive means;

(q) exit ramp attached to the frame to unload the articles which have been processed.

3. An apparatus, as described in claim 2, wherein said articles are nuclear fuel rods.

4. An apparatus, as described in claim 2, wherein said processing units are heat treater units.

5. An apparatus, as described in claim 2, wherein said processing is heat treating.

6. An apparatus, as described in claim 2, wherein said receptacles are heat treater load coils.

7. An apparatus, as described in claim 2, wherein said drive means are servomotors.

8. An apparatus, as described in claim 2, wherein said controllers are computers.

* * * * *